T. H. PARKER.
ROTARY CUTTER.
APPLICATION FILED OCT. 7, 1916.
1,242,369.
Patented Oct. 9, 1917.
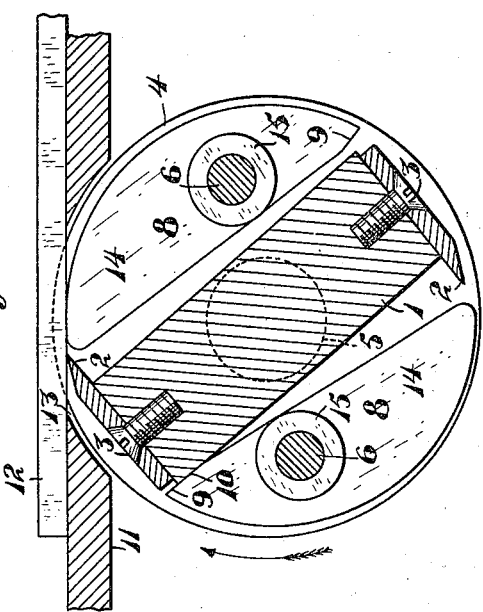
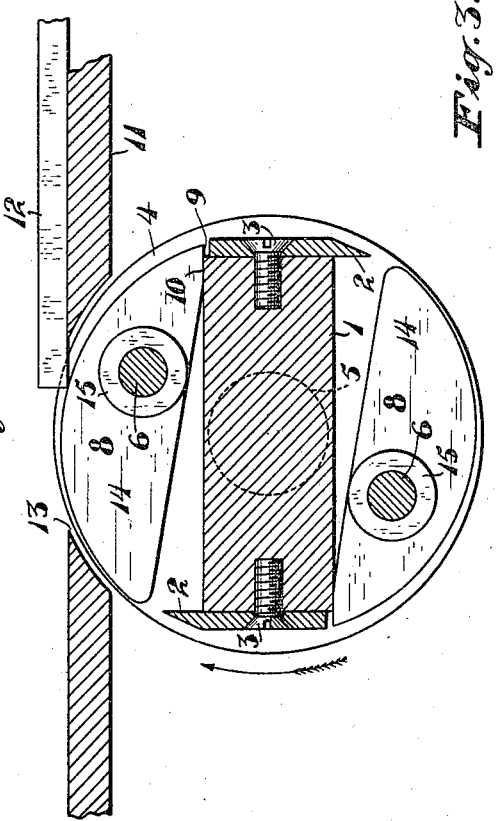
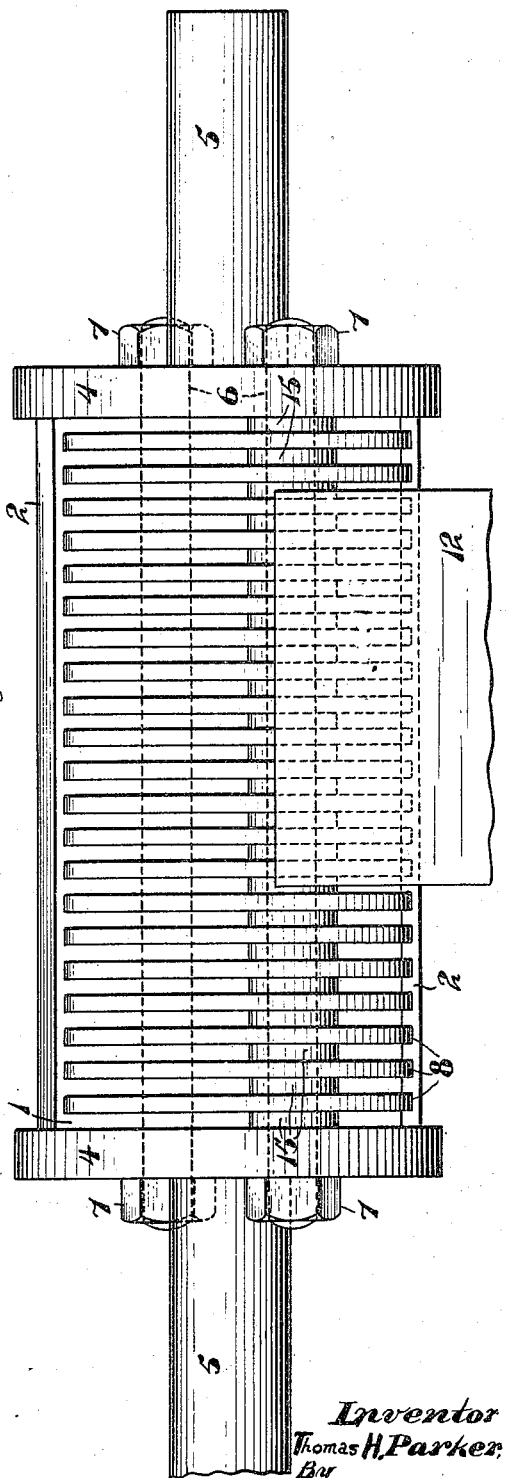
Inventor
Thomas H. Parker,
By
Lincoln Sonntag
Attorney

UNITED STATES PATENT OFFICE.

THOMAS H. PARKER, OF SAN FRANCISCO, CALIFORNIA.

ROTARY CUTTER.

1,242,369.    Specification of Letters Patent.    Patented Oct. 9, 1917.

Application filed October 7, 1916. Serial No. 124,258.

*To all whom it may concern:*

Be it known that I, THOMAS H. PARKER, a citizen of the United States, residing at San Francisco, in the county of San Francisco and State of California, have invented certain new and useful Improvements in Rotary Cutters, of which the following is a specification.

My invention relates to improvements in rotary cutters.

The object of my invention is to provide a rotary cutter for use in wood-working having effective devices for the guarding of the hands of the operator from injury while the machine is in operation, though the operator is not exercising particular care to escape such injury.

My invention consists in the novel parts and arrangements of parts, shown in the accompanying drawing, described in the following specification and claimed in the appended claims.

In the drawing Figure 1 is a transverse sectional view of my rotary cutter showing a board to be planed, which is about to depress one of the guards, consisting of parts which swing out in the path of the cutters shown.

Fig. 2 is a similar view, showing a cutter in a different position, the guard being depressed, permitting the cutter to perform its work.

Fig. 3 is a plan view of Fig. 1.

In the figures, 1 is one of the rectangular cutters, to which cutting blades 2 are secured by means of screws 3. The frame of said cutter has cylindrical plates 4, said plates carrying trunnions 5, which are preferably mounted in suitable bearings on the frame of the machine, not shown. 6 are rods mounted concentrically to the axis of the cutter and which are secured to the end plates 4 by means of the nuts 7. Pivotally mounted on said rods 6 are a plurality of plates 8 overbalanced on one side as shown at 14 so as to be able to swing out in the path of the cutting blades by the centrifugal action or force of the rotary movement.

The force of this movement will overcome the pressure of the hand of the operator thereby preventing the fingers from coming in contact with the cutter. The outward movement of said guards is regulated by means of a shoulder 9 opposite to the end 14 and abutting against the rectangular body as shown at 10. This limits the outer movement of the portion 14. Interposed between each of the guards 8 are spacing washers 15. When a board 12 is moved along the table 11 of the machine, not shown, and comes in contact with the cutter that projects through a slot 13 in said table 11, the end of the board will come into contact with the guards and depress the same as shown in Fig. 2, leaving the outer ones to protect the hands of the operator. Centrifugal force is exerted on the said guards 8 when same are traveling in the direction of the arrows as shown, which force is availed of for the accomplishment of the result. Any width of board may be accommodated between the heads 4 as shown in Fig. 3.

The guards are so arranged that they come in contact with the board after the supporting point has passed in the operation, and so that the force tending to deflect the guards is gradually applied. This is done to prevent chattering of the board due to the too sudden application of the force. The normal position of the guard is such that it is above the arc described by the cutting edge of the blade. A board placed on the table will deflect the guards in contact with it and allow the knife to operate at all other points the knife is protected by the guards. Therefore any operator allowing his hand to come in contact with the head is protected from injury by the projecting guards. The guards are separated by washers among other things to prevent gumming from sap in the lumber.

I claim:

1. A rotary cutter comprising a centrally mounted revoluble support; a knife on each end of said support, one of said knives pointing in a direction opposite to that of the other of said knives, and an eccentrically mounted and outwardly curved guard on each side of said support, the curvature of said guard being approximately the curve of the path of travel of one of said knives, and the point of mounting of said guard having its eccentricity from its center within the area from said center to the end of said guard in proximity to the rear of the opposite knife.

2. A rotary cutter comprising a centrally mounted revoluble support; a knife on each end of said support, one of said knives pointing in a direction opposite to that of the other of said knives, and an eccentrically mounted and outwardly curved guard on each side of said support having a shoulder engageable with said support, the curvature of said guard being approximately the curve of the path of travel of one of said knives, and the point of mounting of said guard having its eccentricity from its center within the area from said center to the end of said guard in proximity to the rear end of the opposite knife.

In testimony whereof I affix my signature in presence of two witnesses.

THOMAS H. PARKER.

Witnesses:
R. B. TREAT,
RAE D. FISH.

Copies of this patent may be obtained for five cents each, by addressing the "Commissioner of Patents, Washington, D. C."